United States Patent [19]

Higo

[11] E Re. 29,217

[45] Reissued May 10, 1977

[54] DIGITAL CIRCUIT

[75] Inventor: Yoshiki Higo, Tokyo, Japan

[73] Assignee: Nippon Electric Company, Ltd., Tokyo, Japan

[22] Filed: Oct. 4, 1976

[21] Appl. No.: 729,288

Related U.S. Patent Documents

Reissue of:

[64] Patent No.: 3,904,895
Issued: Sept. 9, 1975
Appl. No.: 511,083
Filed: Oct. 1, 1974

[30] Foreign Application Priority Data

Oct. 3, 1973 Japan ..... 48-111126

[52] U.S. Cl. ..... 307/288; 307/280; 330/30 D

[51] Int. Cl.[2] ..... H03K 3/286

[58] Field of Search ..... 307/280, 288; 330/30 D

[56] References Cited

UNITED STATES PATENTS

| | | | |
|---|---|---|---|
| 3,268,738 | 8/1966 | Deavenport | 307/288 X |
| 3,425,000 | 1/1969 | Dann | 307/288 X |
| 3,514,633 | 5/1970 | Schroeder | 307/288 X |
| 3,577,015 | 5/1971 | Niemann | 307/288 X |
| 3,639,785 | 2/1972 | Moriyasu | 307/288 |

*Primary Examiner*—John S. Heyman
*Attorney, Agent, or Firm*—Hopgood, Calimafde, Kalil, Blaustein & Lieberman

[57] ABSTRACT

A digital circuit is formed by transistors operable in an unsaturated state. A pair of first transistors are connected in a differential relationship with their emitters commonly connected. A pair of second transistors are also connected in a differential relationship and have their emitters connected in common and their collectors connected respectively to the bases of the first transistors. At least one of the first transistors is connected to the bases of the second transistors to form a feedback loop. First and second current sources are connected to the emitters of the first and second transistors respectively. The state of the circuit is switched by a control signal applied to the bases of one pair of transistors.

7 Claims, 4 Drawing Figures

DIGITAL CIRCUIT

Matter enclosed in heavy brackets [ ] appears in the original patent but forms no part of this reissue specification; matter printed in italics indicates the additions made by reissue.

The present invention relates to a digital circuit of the type having a signal memory function for use in a logical circuit, a pulse regenerating circuit and the like.

A high speed digital circuit having a memory function is typically based on current switching. The current switching circuit consists essentially of two transistors with their emitters coupled to each other to make differential operation available in the unsaturated condition, and hence is able to operate at high speed.

To obtain a memory function in a conventional digital circuit employing a current switching, a positive feedback loop is formed in the circuit through a resistor, a diode, a transistor or the like. For high speed operation, the circuit usually is designed to have constants suitable for operation of low impedance. Such a circuit, however, is unstable in memory function because the positive feedback gain cannot be made high enough due to the low impedance of the circuit. Further details concerning this type of circuit are disclosed in U.S. Pat. No. 3,612,913.

Accordingly, it is an object of this invention to provide a digital circuit which not only is capable of operation at high speed but has high stability in its memory function, without increasing its power consumption. It is another object of the invention to provide a digital circuit which has numerous modes of operation and is driven by a simplified drive circuit. Thus, for example, a pulse regenerating circuit operable at high speed and with high sensitivity can be realized according to this invention.

SUMMARY OF THE INVENTION

The digital circuit of the present invention employs transistors operable in an unsaturated state. Pairs of first and second transistors are each connected in a differential relationship. The second transistors have their collectors connected to the bases of the first transistors. The collector of at least one first transistor is connected to the bases of the second transistors to form a positive feedback loop. In a preferred arrangement the first transistors are PNP transistors and the second transistors are NPN transistors.

First and second current sources are connected to the emitters of the first and second transistors respectively. A first terminal for supplying a constant voltage is connected by a pair of resistors to the bases of the first transistors. A second terminal for supplying a constant voltage is likewise connected by a pair of resistors to the bases of the second transistors. The state of the circuit is switched in response to a control signal applied to the bases of one pair of transistors.

BRIEF DESCRIPTION OF THE DRAWINGS

The present invention is explained in detail in the decription below which may be read in conjunction with the accompanying drawings, wherein.

DESCRIPTION OF THE PREFERRED EMBODIMENT

Figure 1:
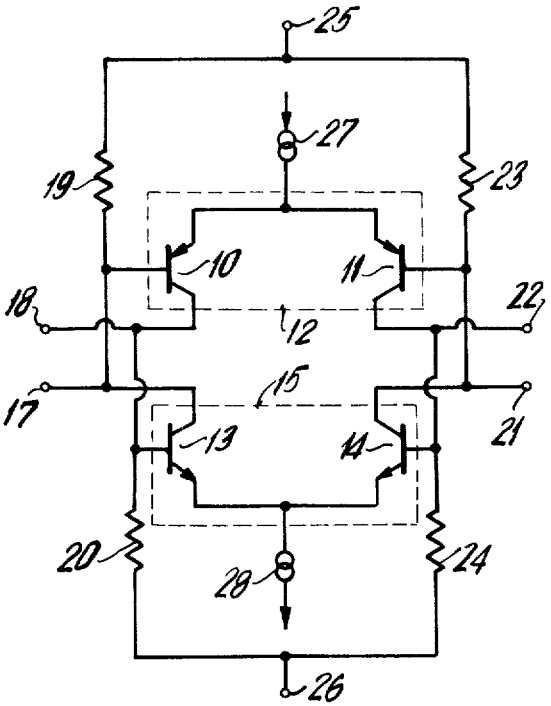
FIG. 1 is a circuit diagram of a first embodiment of the invention.

FIG. 1 shows a digital circuit which includes a P-type current switching circuit 12 comprising two PNP transistors 10 and 11, and an N-type current switching circuit 15 comprising two NPN transistors 13 and 14. The PNP transistor 10 has its collector connected to the base of the NPN transistor 13 at a terminal 18. The terminal 18 is connected to a negative constant voltage source terminal 26 through a resistor 20. The NPN transistor 13 has its collector connected to the base of the PNP transistor 10 at a terminal 17. The terminal 17 is connected to a positive constant voltage source terminal 25 through a resistor 19. Similarly, the PNP transistor 11 has its collector connected to the base of the NPN transistor 14 at a terminal 22. The terminal 22 is connected to a negative constant voltage source terminal 26 through a resistor 24. Further, the NPN transistor 14 has its collector connected to the base of the PNP transistor 11 at a terminal 21. The terminal 21 is connected to the positive constant voltage source terminal 25 through a resistor 23. A a closed circuit is thereby formed beginning with the base of the PNP transistor 10 by way of the terminal 18, the base and collector of the NPN transistor 13, and the terminal 17. This closed circuit is a positive feedback loop since the base-to-collector voltage amplifying characteristic stands at negative polarity. Similarly, another closed circuit is formed beginning with the base of the PNP transistor 11 by way of the collector of the PNP transistor 11, the terminal 22, the base and collector of the NPN transistor 14, and the terminal 21. This closed circuit also forms a positive feedback loop. The emitters of the PNP transistors 10 and 11 are connected to a positive constant current source 27 to form the P-type current switching circuit 12. Also, the emitters of the NPN transistors 13 and 14 are connected to a negative constant current source 28 to form the N-type current switching circuit 15.

This digital circuit of the invention operates on the following principle. The current from the positive constant current source 27 flows to the negative constant voltage source terminal 26 either through the emitter and collector of the PNP transistor 10 and the resistor 20 or through the emitter and collector of the PNP transistor 11 and the resistor 24. The path which the current takes depends upon the voltages at the two base terminals 17 and 21 of the P-type current switching circuit 12. To arrive at the negative current source 28, the current from the positive constant voltage source terminal 25 flows either through the collector and emitter of the NPN transistor 13 and the resistor 19, or through the collector and emitter of the NPN transistor 14 and the resistor 23. The path taken depends upon the voltages at two base terminals 18 and 22, of the N-type current switching circuit 15. In other words, the circuit can assume two states, depending upon the condition of the positive feedback loop described above. More specifically, when the current from the positive constant current source 27 flows through the PNP transistor 10, the voltage at the terminal 18 becomes higher than that at the negative constant voltage terminal 26, i.e., at the terminal 22, with the result that the current from the negative constant source 28 flows through the NPN transistor 13. Then, the voltage at the terminal 17 becomes lower than that at the constant voltage terminal 25, i.e., at the terminal 21, to cause the current from the positive constant current source 27 to flow more through the PNP transistor 10. Alternatively, the current flows through the PNP and NPN transistors 11 and 14. Thus the circuit can assume two states, referred to as the state A and the state B, according to the manner in which the current from the constant current sources 27 and 28 flows through the PNP and NPN transistors 10 and 13 or through the PNP and NPN transistors 11 and 14.

To switch the digital circuit from state A state B, four approaches can be considered: (1) the voltage at the terminal 17 can be made higher than that at the terminal 21, (2) the voltage at the terminal 21 can be made lower than that at the terminal 17, (3) the voltage at the terminal 18 can be made lower than that at the terminal 22, or (4) the voltage at the terminal 22 can be made higher than that at the terminal 18. To switch the circuit from state B to state A, there are four similar approaches available with the high-low potential relationship reversed at the corresponding terminals. Reading out of the circuit state and the delivery of the output signals can be carried out at the terminals 17, 18, 21 and 22. In this circuit, an operating bias voltage is common to the terminals 17 and 21, and another operating bias voltage is common to the terminals 18 and 22, the two operating bias voltages being different from each other. The signals at the terminals 17 and 22 take one polarity and the signal at the terminals 18 and 21 take the opposite polarity.

As described above the first embodiment of the invention can have two stable states, thus providing the memory function. Moreover, since the operating current is limited due to the fact that the digital circuit of the invention is formed by current switching circuits, all the transistors used can be prevented from becoming saturated, by suitably determining the voltages at the terminals 25 and 26. A further advantage is the freedom to determine a suitable potential difference between the collector and the base of a transistor according to the characteristics of the transistor, thereby enabling the circuit to be readily adapted for high speed operation. Still further, since the positive feedback loop is formed entirely of transistors to make it possible to approximately double the gain of the feedback loop in comparison with that of the above-mentioned conventional digital circuits, the positive feedback loop gain becomes large and stable. Furthermore, the power consumption of the circuit can be reduced by suitably combining PNP and NPN transistors. In addition, as mentioned above, the circuit can be switched from one state to another in various ways and the output signal can be delivered from the various points, with the result that the design flexibility of the drive circuit and the output circuit is greatly enhanced.

Figure 2:
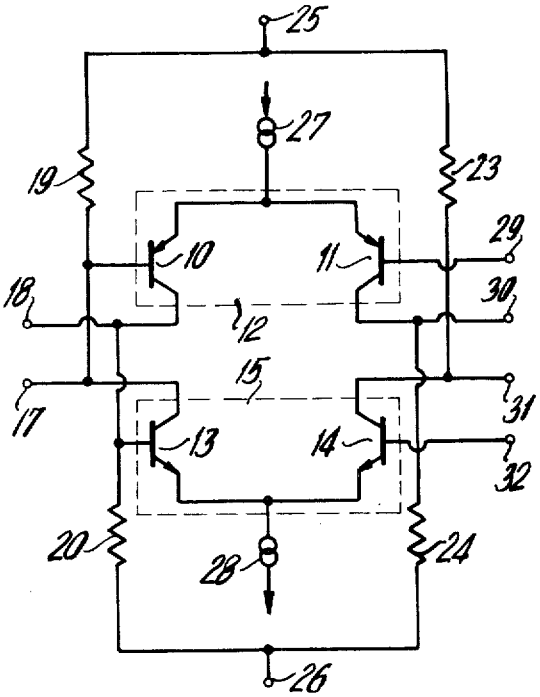
FIG. 2 is a circuit diagram of a second embodiment of the invention.
Figure 3:
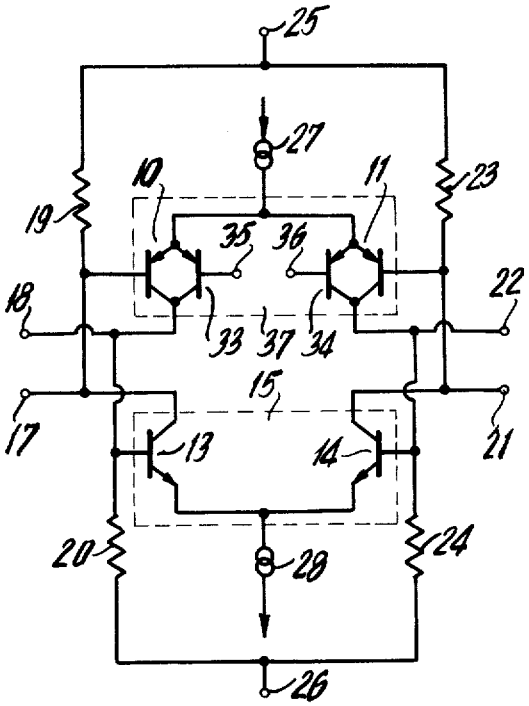
FIG. 3 is a circuit diagram of a third embodiment of the invention.

In FIG. 2, a second embodiment of the invention is shown, which is a modification of the embodiment shown in FIG. 1. In this second embodiment, only one positive feedback loop is formed by a PNP transistor 10 and an NPN transistor 13. A PNP transistor 11 has its base connected independently to a terminal 29, and its collector connected not to the base of an NPN transistor 14 but to a terminal 30 which is in turn connected to a negative constant voltage source terminal 26 through a resistor 24. The NPN transistor 14 has its base connected independently to a terminal 32 and its collector connected not to the base of the PNP transistor 11 but to a terminal 31 which is in turn connected to a positive constant voltage source terminal 25 through a resistor 23. Similarly to the circuit shown in FIG. 1, the PNP transistors 10 and 11 constitute a P-type current switching circuit 12; and the NPN transistors 13 and 14, an N-type current switching circuit 15. Hence the digital circuit of the second embodiment operates in the same manner as the circuit of the first embodiment. In comparison with the first embodiment, the second is advantageous in that an isolated output signal can be obtained across terminals 30 and 31 in accordance with an input signal applied across terminals 29 and 32. The total positive feedback loop gain of this circuit is nearly halved in comparison with that of the first embodiment. FIG. 3 shows a third embodiment of the invention which overcomes a problem involved in the second embodiment. In the third embodiment, PNP transistors 33 and 34 are added to the circuit illustrated in FIG. 1. The PNP transistor 33 has its collector connected to the collector of a PNP transistor 10, and the PNP transistor 34 has its collector connected to the collector of a PNP transistor 11. The base of the PNP transistors 33 and 34 are connected independently to terminals 35 and 36 respectively. The PNP transistors 10, 11, 33 and 34 have their emitters connected to a common positive constant current source 27, thus forming a P-type current switching circuit having two pairs of PNP transistors. The current switching circuit including the PNP transistors 10, 11, 33 and 34 has the following logic functions. In view of the applicable negative voltage logic, the terminals 17 and 35 stand at voltages for OR logic against a reference voltage which is the lower of the two voltages presented at terminals 21 and 36. The terminals 21 and 36 stand at voltages for OR logic against a reference voltage which is the lower of the voltages presented at terminals 17 and 35. Thus, the circuit is switched from state A (the state in which the voltage at the terminal 17 is lower than that at the terminal 21) to B (the state in which the voltage at the terminal 17 is higher than that at the terminal 21) by instantaneously applying to the terminal 36 a voltage lower than that at the terminal 17. It is apparent from the principles of OR logic that the above-mentioned switching does not occur when a voltage lower than that at the terminal 17 is applied only to the terminal 35. The circuit state can also be switched from state B to state A by instantaneously applying to the terminal 35 a voltage lower than that at the terminal 21. In this operation it is also apparent that switching does not occur when a voltage lower than that at the terminal 21 is applied only to the terminal 36. Therefore, the reference voltage with respect to the terminals 35 and 36 is to be the lower of the two voltages at the terminals 17 and 21. Thus, at the terminal 35 and 36, the voltages needed to switch the state of the circuit from state A to state B and vice versa, i.e., the so-called threshold levels for setting and resetting the circuit state, can be made equal to the lower voltage available at the terminals 17 and 21. In other words, the third embodiment of the invention makes it possible to design a pulse regenerating circuit free from hysteresis in the input-output characteristics. In contrast to the first embodiment, this third embodiment enables the output signal to be completely isolated from the input signal without reducing the positive feedback loop gain. As a modification of the embodiment of FIG. 3, the conduction types of the transistors may be reversed without affecting the performance of the circuit of the invention, if the constant current, the constant voltage, and the signal voltage are reversed accordingly.

Figure 4:
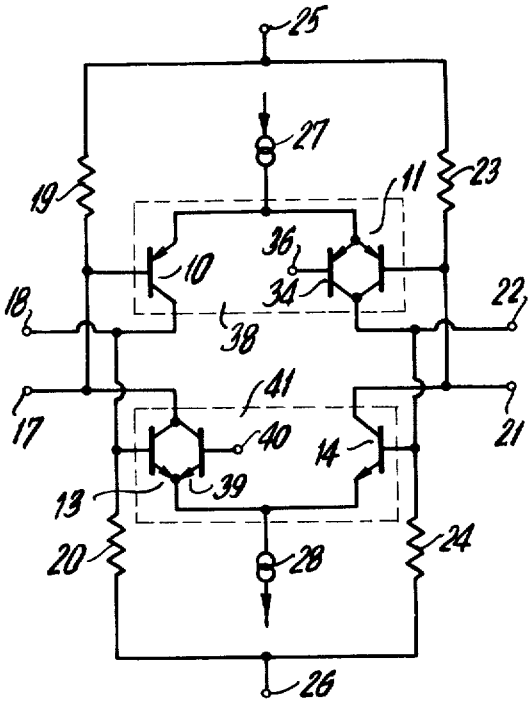
FIG. 4 is a circuit diagram of a fourth embodiment of the invention.

FIG. 4 shows a fourth embodiment of the invention. This digital circuit uses a PNP transistor 34 and an NPN transistor 39 in addition to the constituent elements of the digital circuit shown in FIG. 1. The PNP transistor 34 has its collector connected to the collector of a PNP transistor 11, and its base connected independently to a terminal 36. Three PNP transistors 10, 11 and 34 have their emitters connected to a common positive constant current source 27, thus forming a P-type current switching circuit 38.

The NPN transistor 39 has its collector connected to the collector of the NPN transistor 13, and its base connected independently to a terminal 40. Three NPN transistors 13, 14 and 39 have their emitters commonly connected to a negative constant current source 28, thus forming an N-type current switching circuit 41.

The P-type current switching circuit 38 has an OR logic function performed as in the circuit of FIG. 3. Thus switching from state A to state B occurs when a voltage lower than that at the terminal 17 is applied to the terminal 36. In view of its positive voltage logic, the N-type current switching circuit 41 also operates for OR logic. That is, the terminals 18 and 40 stand at voltages in an OR logic relationship against a reference voltage at the terminal 22. Hence, by instantaneously applying to the terminal 40 a voltage higher than that at the terminal 22, the state B, i.e., the state in which the voltage at the terminal 22 is higher than that at the terminal 18, is switched to the state A. In the circuit of FIG. 4, unlike to the circuit of FIG. 3, the two input signals which cause the circuit to switch its state differ in operation point and polarity from each other. As in the third embodiment, the fourth embodiment can isolate the output signal from the input signal and enables the hysteresis phenomenon to be completely precluded by suitably determining the operation point of the input signal.

The terms "positive voltage source" and "negative voltage source" used in the description of the embodiments imply that the former is higher than the latter. It should be noted that they do not always refer to the polarities of the voltage source.

As has been described in detail, the digital circuit of the invention utilizes high-speed P-type and N-type current switching circuits, each forming a positive feedback loop therein. Thus, it can provide a high-speed, high-stability, and high-sensitivity digital circuit suited for a memory function with low power consumption.

It will be obvious to those skilled in the art that the above-described embodiments are meant to be merely exemplary and that they are susceptible of modification and variation without departing from the spirit and scope of the invention. Therefore, the invention is not deemed to be limited except as defined by the appended claims.

What is claimed is:

1. A digital circuit employing transistors operable in an unsaturated state comprising:

a pair of first transistors connected in a differential relationship with their emitters connected in common;

a pair of second transistors connected in a differential relationship with their emitters connected in common and with their collectors connected respectively to the bases of said first transistors, the collector of at least one of said first transistors being connected to the bases of the second transistors thereby forming a positive feedback loop between said pairs of transistors;

a first current source connected to the emitters of said first transistors;

a second current source connected to the emitters of said second transistors;

a first terminal for supplying a first constant voltage;

a first pair of resistors by which the first terminal is connected to the bases of the first transistors;

a second terminal for supplying a second constant voltage; and a second pair of resistors by which the second terminal is connected to the bases of the second transistors;

whereby the state of the digital circuit is switched alternately in response to a control signal applied to the bases of one pair of transistors.

2. The circuit of claim 1, wherein the first transistors are PNP transistors and the second transistors are NPN transistors.

3. The circuit of claim 1, wherein the first transistors form part of a P-type current switching circuit and the second transistors form part of an N-type current switching circuit.

4. The circuit of claim 3, wherein each of the switching circuits includes a constant current source.

5. The circuit of claim 1, wherein the collector of another of the first transistors is connected to the bases of the second transistors thereby forming a second positive feedback loop.

6. The circuit of claim 1, further comprising a pair of additional transistors connected emitter to emitter and collector to collector to each of the first transistors respectively, the bases of the additional transistors providing additional input terminals.

7. The circuit of claim 6, wherein the first transistors and the additional transistors are PNP transistors.

* * * * *